3,394,124
MONOAZO PIGMENTS CONTAINING 2,3-HYDROXYNAPHTHOIC ACID AMIDE DERIVATIVES
Karl Ronco and Willy Mueller, Riehen, Switzerland, assignors to Ciba Limited, Basel, Switzerland, a Swiss company
No Drawing. Filed June 22, 1965, Ser. No. 466,104
Claims priority, application Switzerland, June 26, 1964, 8,413/64
7 Claims. (Cl. 260—204)

ABSTRACT OF THE DISCLOSURE

Monoazo pigments of the formula

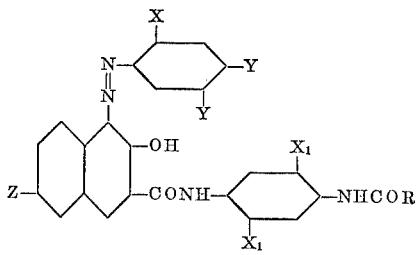

in which X is a halogen atom, an alkyl-, alkoxy- or nitro-group, one Y is a halogen atom, an alkyl-, alkoxy- or nitro-group and the other Y a hydrogen atom or an alkyl group, Z is a hydrogen or halogen atom or an alkoxy-group, and either both $X_1$ are hydrogen or halogen atoms or alkyl or alkoxy groups or one $X_1$ is a hydrogen atom and the other a halogen atom or an alkoxy- or trifluoromethyl-group and R is a benzene radical substituted by an alkoxy-, phenoxy-, carboxy-ester- or aliphatic acylamino-group which pigments are useful in dyeing natural and synthetic resins with excellent fastness to light migration and over-lacquering.

---

The present invention provides monoazo pigments of the formula (1)

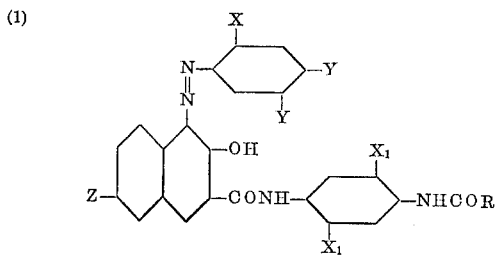

in which X is a halogen atom, an alkyl-, alkoxy- or nitro-group, one Y is a halogen atom, an alkyl-, alkoxy- or nitro-group and the other Y a hydrogen atom or an alkyl group, Z is a hydrogen or halogen atom or an alkoxy-group, and either both $X_1$ are hydrogen or halogen atoms or alkyl or alkoxy-groups or one $X_1$ is a hydrogen atom and the other a halogen atom or an alkoxy- or trifluoromethyl-group and R is a benzene radical substituted by an alkoxy-, phenoxy-, carboxy-ester- or aliphatic acylamino-group.

Since the products of the invention are pigments, water-solubilizing groups, particularly acidic water-solubilizing groups, such as sulfonic acid or carboxylic acid groups, are of course excluded.

The new dyestuffs may be obtained by (a) condensing a carboxylic acid halide of the formula (2)

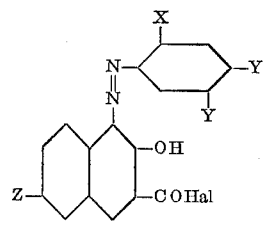

with an amine of the formula (3)

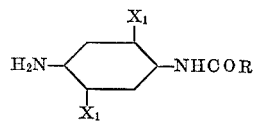

in which the two $X_1$ groups and R have the significance indicated above, (b) coupling a diazo compound of an amine of the formula (4)

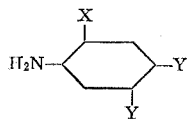

with a naphthol of the formula (5)

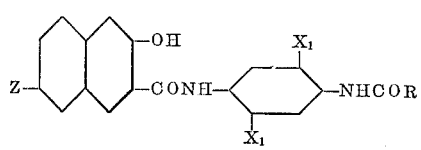

The carboxylic acid chlorides are preferably used for method (a) of the process of the invention. The corresponding carboxylic acids may be obtained by coupling a diazo compound of an amine of Formula (4) with for example 2:3-hydroxynaphthoic acid, 2-hydroxy-6-bromo-3-naphthoic acid and 2-hydroxy-6-methoxy-3-naphthoic acid.

The following amines may be quoted as examples of diazo components: 2-chloro-4-methylaniline, 2-chloro-4-methoxyaniline, 2-chloro-4-nitroaniline, 2:4-dichloroaniline, 2:5-dichloroaniline, 2:5-dibromoaniline, 2-chloro-5-methylaniline, 2-chloro - 5 - methoxyaniline, 2-chloro-5-nitroaniline, 2:4 - dimethylaniline, 2-methyl-4-chloroaniline, 2-methyl-4-methoxyaniline, 2-methyl-4-nitroaniline, 2-methyl-5-chloroaniline, 2-methyl-5-methoxyaniline, 2-methyl - 5 - nitroaniline, 2-methoxy-4-chloroaniline, 2-methoxy-4-methylaniline, 2 - methoxy-4-nitroaniline, 2-methoxy-5-chloroaniline, 2-methoxy-5-methylaniline, 2-methoxy-5-nitroaniline, 2-nitro-4-chloroaniline, 2-nitro-4-methylaniline, 2-nitro-4-methoxyaniline, 2:4 - dinitroaniline, 2 - nitro-5-chloroaniline, 2-nitro-5-methylaniline, 2-nitro-5-methoxyaniline, 2-methoxy-4-chloro-5-methylaniline.

The azo dyestuff carboxylic acids obtained are treated with reagents capable of converting carboxylic acids to their halides, e.g. chlorides or bromides, particularly with phosphorus halides such as phosphorus pentabromide or phosphorus trichloride or pentachloride, phosphorus oxyhalides and preferably thionyl chloride.

The treatment with such acid halide-producing reagents is conveniently carried out in inert organic solvents such as dimethylformamide, chlorobenzenes e.g. monochlorobenzene or dichlorobenzene, toluene, xylene or nitrobenzene, optionally with the addition of dimethylformamide in the case of the last five named solvents.

In the preparation of carboxylic acid halides it is generally desirable first to dry the azo compounds which have been prepared in aqueous medium, or to free them from water by azeotropic distillation in an organic solvent. This azeotropic drying can, if desired, be carried out immediately prior to treatment with the acid halide-forming reagents.

The resulting azo dyestuff carboxylic acid chlorides are condensed with monoamines of Formula (3). The following amines may be quoted as examples:

4′-methoxybenzoylamino-aniline,
2-chloro-4-(4′-methoxybenzoylamino)-aniline,
2-methoxy-4-(4′-methoxybenzoylamino)-aniline,
2:5-dichloro-4-(4′-methoxybenzoylamino)-aniline,
2:5-dichloro-4-(3′-methoxybenzoylamino)-aniline,
2:5-dimethyl-4-(4′-methoxybenzoylamino)-aniline,
2:5-dimethyl-4-(4′-ethoxybenzoylamino)-aniline,
2-chloro-5-methyl-4-(4′-methoxybenzoylamino)-aniline,
2-methoxy-5-chloro-4-(4′-methoxybenzoylamino)-aniline,
3-trifluoromethyl-4-(4′-methoxybenzoylamino)-aniline,
2:5-dimethyl-4-(4′-acetylamino)-benzoylaminoaniline,
2:5-dimethyl-4-(3′-acetylamino)-benzoylaminoaniline,
4-(3′-acetylamino)-benzoylaminoaniline,
2-methoxy-5-chloro-4-(4′-acetylamino)-benzoylaminoaniline,
2:5-dimethyl-4-(4′-nitro)-benzoylaminoaniline,
2:5-dichloro-4-(4′-nitro)-benzoylaminoaniline,
2:5-dichloro-4-(4′-nitro)-benzoylaminoaniline,
4-(3′-nitro)-benzoylaminoaniline,
2:5-dimethyl-4-(4′-chlorophenoxy)-benzoylaminoaniline,
2:5-dichloro-4-(4′-phenoxy)-benzoylaminoaniline,
4-(2′:4′-dichlorophenoxy)-benzoylaminoaniline,
4-(2′:4′:6′-trichlorophenoxy)-benzoylaminoaniline,
2:5-dimethyl-4-(4′-carbomethoxy)-benzoylaminoaniline,
2:5-dichloro-4-(4′-carbomethoxy)-benzoylaminoaniline,
4-(4′-carbomethoxy)-benzoylaminoaniline,
2:5-dichloro-4-(4′-carbethoxy)-benzoylaminoaniline,
4-(4′-carbethoxy)-benzoylaminoaniline,
4-(p-chlorophenoxy)-benzoic acid-(2′:5′-dimethyl-4′-amino)-anilide,
4-(m-chlorophenoxy)-benzoic acid-2′:5′-dichloro-4′-amino)-anilide,
4-(p-chlorophenoxy)-benzoic acid-(2′-methyl-5′-chloro-4′-amino)-anilide,
4-phenoxy benzoic acid-(2′-chloro-5′-methyl-4′-amino)-anilide,
4-(p-chlorophenoxy)-benzoic acid-4′-aminoanilide,
4-(p-bromophenoxy)-benzoic acid-4′-aminoanilide,
4-(p-fluoro)-benzoic acid-4′-aminoanilide.

The condensation of the carboxylic acid halides of the type described, with the amines is conveniently carried out in an anhydrous medium. Under these conditions it generally takes place surprisingly easily even at temperatures within the boiling range of the common organic solvents such as toluene, monochlorobenzene, dichlorobenzene, trichlorobenzene, nitrobenzene and similar materials. The use of an acid-binding reagent such as anhydrous sodium acetate or pyridine is generally recommended for accelerating the reaction. The resulting dyestuffs are in part crystalline and in part amorphous and are in most cases obtained in very good yield and in a pure state. It is desirable first to separate the acid chlorides obtained from the carboxylic acids. In many cases however a separation of the acid chlorides can be omitted without detriment and the condensation can be carried out immediately following the production of the carboxylic acid chlorides.

According to method (b) of the process of the invention the new pigments may be obtained by coupling a diazo compound of an amine of Formula (4) with a naphthol of Formula (5), particularly with one of the formula

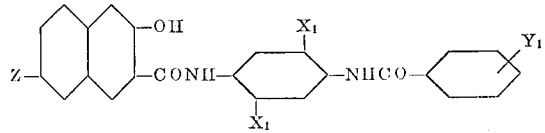

in which $X_1$ and $Z$ have the significance indicated and $Y_1$ is a alkoxy, phenoxy, carboxylic acid ester, carbalkoxy or aliphatic acylamino group.

The coupling takes place by gradual addition of the aqueous alkaline solution of the coupling component to the acid solution of the diazonium salt. The amount of alkali hydroxide to be used for dissolving the coupling component is conveniently chosen so as to suffice for the neutralization of the mineral acid liberated from the diazonium salt during the coupling. The coupling is conveniently carried out at a pH-value of 4 to 6. The pH-value is advantageously adjusted by addition of a buffer. Appropriate buffers are e.g. salts, particularly alkali metal salts, of formic acid, phosphoric acid or particularly acetic acid. The alkaline solution of the coupling component preferably contains a wetting, dispersing of emulsifying agent, for example an aralkyl sulfonate such as dodecylbenzene sulfonate or the sodium salt of 1:1′-naphthylmethanesulfonic acid, polycondensation products of alkylene oxides such as the reaction product of ethylene oxide with p-tertiary-octylphenol, or alkyl esters of sulforicinoleates, for example n-butyl sulforicinoleates. The dispersion of the coupling component may also advantageously contain protective colloids, for example methylcellulose or small amounts of inert organic solvents which are slightly soluble or insoluble in water, for example optionally halogenated or nitrated aromatic hydrocarbons such as benzene, toluene, xylene, chlorobenzene, dichlorobenzene or nitrobenzene, as well as aliphatic halogenated hydrocarbons such as for example carbon tetrachloride or trichlorethylene, as well as organic solvents which are miscible with water such as acetone, methyl ethyl ketone, methanol, ethanol or isopropanol.

The coupling can also advantageously be carried out by continuously mixing an acid solution of the diazonium salt with an alkaline solution of the coupling component in a mixing nozzle whereby immediate coupling of the components takes place. Care must be taken to ensure that the diazo-component and the coupling component are present in the mixing nozzle in equimolar amounts. A small excess of the coupling component is however advantageous. This is most simply achieved by controlling the pH-value of the liquid in mixing nozzle. It is also necessary to ensure vigorous agitation of the two solutions in the mixing nozzle. The resulting pigment dispersion is continuously withdrawn from the mixing nozzle and the pigment separated by filtration.

The new products are valuable pigments which may be used for the most diverse applications. For example, they may be used in finely divided form for the spin-dyeing of viscose, or cellulose ethers and esters, or polyamides or polyurethanes, or polyesters, as well as for the production of colored lacquers, lake formers, solutions or products of acetylcellulose, nitrocellulose, naturally occurring resins or synthetic resins such as polymerization or condensation resins, for example aminoplasts, alkyd resins, phenolic resins, polyolefines, polystyrene, polyvinyl chloride, polyethylene, polypropylene, polyacrylonitrile, rubber, casein, silicone and silicone resins. They may furthermore be used with advantage in the production of crayons, cosmetic preparations or laminated sheets.

The following examples illustrate the invention, the parts and percentages being by weight unless otherwise indicated and temperatures in degrees centigrade.

EXAMPLE 1

54.2 parts of the dyestuff obtained by diazotizing 2:5-dichloro-1-aminobenzene in aqueous hydrochloric acid with sodium nitrate and coupling with 2:3-hydroxynaphthoic acid are mixed with 500 parts of o-dichlorobenzene, 25 parts of thionylchloride and 2.5 parts dimethyl formamide and heated, with stirring, to 110–115° C. for 1 hour. When the reaction mixture has cooled the uniformly crystalline monocarboxylic acid chloride of the dyestuff is isolated by filtration, washed with cold o-dichlorobenzene and benzene and dried in vacuo at 50–60° C.

6.84 parts of this chloride mixed with 5 parts of 2:5-dimethyl-4-(4′-methoxy)-benzoylaminoaniline and 400 parts of o-dichlorobenzene are heated for 14 hours at 140–145° C. Thereafter the crystalline slightly soluble pigment is filtered off hot, washed with hot o-dichlorobenzene, boiling alcohol and hot water and dried in vacuo at 70 to 80°. The product obtained, of the formula

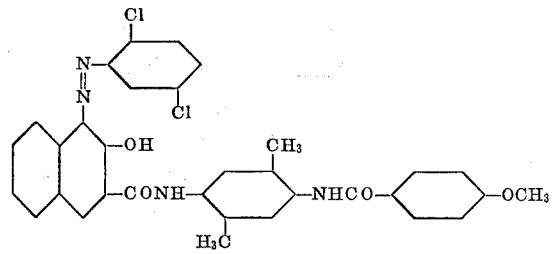

is a red pigment which is slightly soluble or insoluble in the common solvents and colors polyvinyl chloride film and lacquers scarlet red shades having excellent fastness to light, migration and over-lacquering.

The azo dyestuff monocarboxylic acids obtainable from the mono-nuclear diazo components of column I and the coupling components of column II of the following table may be reacted, via the corresponding monoazo dyestuff monocarboxylic acid chlorides, with 1 mole of the aromatic bi-nuclear monoamines listed in column III in a manner corresponding to that described in paragraphs 1 and 2 of Example 1. Column IV denotes the color of a polyvinyl chloride film containing the pigment.

| | I | II | III | IV |
|---|---|---|---|---|
| 1 | 2:5-dichloroaniline | 2:3-hydroxy-napthoic acid | 4-(4′-methoxy)-benzoylaminoaniline | Scarlet. |
| 2 | do | do | 2:5-dichloro-4-(4′-methoxy)-benzoylaminoaniline. | Do. |
| 3 | do | do | 2-methoxy-5-chloro-4-(4′-methoxy)-benzoylaminoaniline | Red. |
| 4 | do | do | 2-methyl-5-chloro-4-(4′-methoxy)-benzoylaminoaniline. | Scarlet. |
| 5 | do | do | 2-chloro-5-methyl-4-(4′-methoxy)-benzoylaminoaniline. | Do. |
| 6 | do | do | 2:5-dimethyl-4-(4′methoxy)-benzoylaminoaniline. | Red. |
| 7 | do | do | 2:5-dimethyl-4-(4′-isopropoxy)-benzoylaminoaniline. | Red. |
| 8 | do | 6-bromo-2:3-hydroxy-naphthoic acid | 2:5-dimethyl-4-(4′-methoxy)-benzoylaminoaniline. | Bluish red |
| 9 | do | 6-methoxy-2:3-hydroxy-naphthoic acid. | do | Bordeaux. |
| 10 | 2:5-dibromoaniline | 2:3-hydroxy-naphthoic acid | do | Red. |
| 11 | 2:5-dichloroaniline | do | 2:5-dichloro-4-(4′-acetylamino)-benzoylaminoaniline. | Red. |
| 12 | do | do | 2:5-dimethyl-4-(4′-carbomethoxy)-benzoylaminoaniline. | Red. |
| 13 | do | do | 2:5-dimethyl-4-(4′-carbethoxy)-benzoylaminoaniline. | Red. |
| 14 | do | do | 4-(4′-carbomethoxy)-benzoylaminoaniline | Orange red. |
| 15 | do | do | 2:5-dimethyl-4-(4′-acetylamino)-benzoylaminoaniline. | Red. |
| 16 | do | do | 2:5-dimethyl-4-(3′-acetylamino)-benzoylaminoaniline. | Red. |
| 17 | do | do | 2-methoxy-5-chloro-4-(4′-carbomethoxy)-benzoylaminoaniline. | Brown. |
| 18 | do | do | 2-methyl-5-chloro-(4′-carbomethoxy)-benzoylaminoaniline. | Red. |
| 19 | 2:5-dichloro-aniline | do | 4-(2′-acetylamino)-benzoylaminoaniline | Red. |
| 20 | 5-chloro-2-methoxyaniline | do | 4-(4′-carbomethoxy)-benzoylaminoaniline | Red. |
| 21 | 4-nitro-2-methoxyaniline | do | 2:5-dimethyl-4-(4′-acetylamino)-benzoylaminoaniline. | Red. |
| 22 | 5-nitro-2-methoxyaniline | do | 2:5-dimethyl-4-(4′-methoxy)-benzoylaminoaniline. | Red. |
| 23 | do | do | 2:5-dimethyl-4-(4′-acetylamino)-benzoylaminoaniline. | Red. |
| 24 | 4-nitro-2-methylaniline | do | 4-(4′-methoxy)-benzoylaminoaniline | Red. |
| 25 | 5-nitro-2-methylaniline | do | do | Red. |
| 26 | 2:5-dichloroaniline | do | 2:5-dichloro-4-(4′-nitro)-benzoylaminoaniline | Red. |
| 27 | do | do | 4-(p-chlorophenoxy)-benzoic acid-(2′:5′-dimethyl-4′-amino)-anilide. | Scarlet. |
| 28 | do | do | 4-(p-chlorophenoxy)-benzoic aicd-4′-aminoanilide. | Do. |
| 29 | 5-methyl-4-chloro-2-methoxy-aniline | do | 4-(4′-methoxy)-benzoylaminoaniline | Red. |

EXAMPLE 2

8.1 parts of 2:5-dichloro-1-aminobenzene are diazotized in the usual manner using aqueous hydrochloric acid, ice and sodium nitrite.

Separately, 22.2 parts of 1-chloro-2-(2′hydroxy-3′-naphthoylamino) - 4 - chloro - 5-(4″-methoxy)-benzoylaminobenzene are dissolved in 50 parts of ethanol, 10 parts of 30% caustic soda, 200 parts of water and 100 parts of ethylene glycol monoethyl ether. The solution is treated with 1 part of the condensation product of 8 moles of ethylene oxide and 1 mole of p-tertiary octylphenol and the naphthol thereafter precipitated by means of 70 parts of glacial acetic acid, with vigorous stirring.

Coupling is carried out by adding the diazo solution described in paragraph 1 whilst maintaining a pH-value of 3 to 4 and a temperature of 35 to 40°. Stirring is continued for 2 hours at the same temperature to complete the coupling, the resulting pigment suspension is rendered acid to Congo Red by the addition of hydrochloric acid and filtered. The filter residue is washed with hot water until no chlorine ions can be detected in the filtrate.

After drying in vacuo at 80 to 90° the red pigment of the formula given in Example 1 is obtained in good yield. It colors plastics for example polyvinyl chloride and lacquers scarlet red shades having good fastness to migration, over-lacquering and light.

EXAMPLE 3

16.2 parts of 2:5-dichloro-1-aminobenzene are diazotized as described in Example 1 and clarified by filtration.

Separately, 48 parts of 1-chloro-2-(2′-hydroxy-3′-naphthoylamino)-4-chloro - 5-(4″ - methoxy) - benzoylaminobenzene are dissolved, in the cold, in a mixture of 150 parts of ethylene glycol monoethyl ether and 10 parts of 30% caustic soda. The two solutions, if necessary diluted with water, are continuously fed to a mixing nozzle where instantaneous coupling of the components takes place. Control of rate of flow of the feed solutions ensures that the pH-value in the mixing nozzle lies between 5 and 6. The temperature should be between 35 and 40°. This can be controlled by adding water to the solutions of the components. The resulting pigment suspension is filtered and the filter residue is washed. The latter is then stirred with a mixture of 20 parts water, 110 parts ethylene glycol monoethyl ether and 100 parts o-dichlorobenzene and the whole is filtered. The filter residue is washed first with ethylene glycol monoethyl ether, then with methanol and then dried in vacuo at 70 to 80°. The pigment which is obtained in practically quantitative yield corresponds to the product obtained according to Example 1 in respect to shade, purity, fineness of subdivision and fastness properties.

Particularly fine subdivision of the pigment obtained is achieved by adding an anionic or a non-ionic wetting agent, for example the sodium salt of N-benzyl-μ-heptadecyl-benzimidazole disulfonic acid, to the solution of the diazo component or of the coupling component.

EXAMPLE 4

65 parts of stabilized polyvinyl chloride, 35 parts dioctyl phthalate and 0.2 part of the pigment obtained according to Example 1, paragraph 2 are stirred together and then rolled to and fro on a two-roll calender for 7 minutes at 140°. A scarlet-red film of very good light and migration fastness is obtained.

What is claimed is:
1. A monoazo pigment of the formula

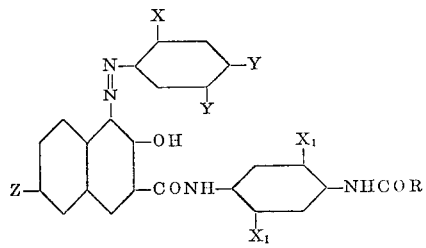

in which X is a chlorine or bromine atom, a lower alkyl-, lower alkoxy- or nitro-group, one Y is a chlorine or bromine atom, a lower alkyl-, lower alkoxy- or nitro-group and the other Y is a hydrogen atom or a lower alkyl group, Z is a hydrogen or bromine atom or a lower alkoxy-group, and both $X_1$ are hydrogen or chlorine atoms or lower alkyl or lower alkoxy-groups or one $X_1$ is a hydrogen atom and the other a chlorine atom, a lower alkoxy- or trifluoromethyl-group and R is a benzene radical substituted by a lower alkoxy-, phenoxy-, lower carbalkoxy- or lower alkanoylamino-group.

2. Monoazo pigments of the formula

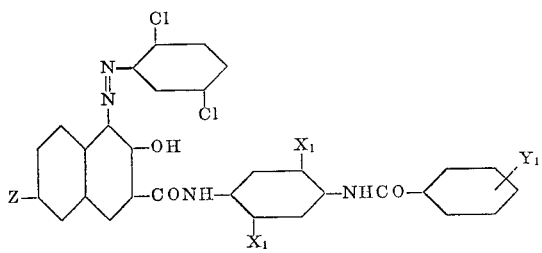

in which the $X_1$ groups and Z have the significance indicated above and $Y_1$ is a lower alkoxy-, phenoxy-, lower carbalkoxy- or alkanoylamino-group.

3. The pigment of the formula

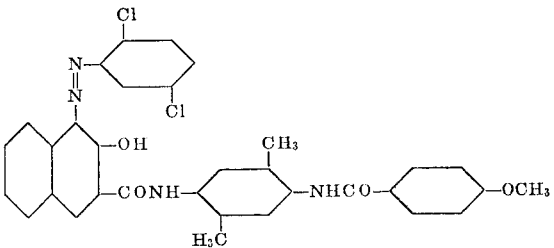

4. The pigment of the formula

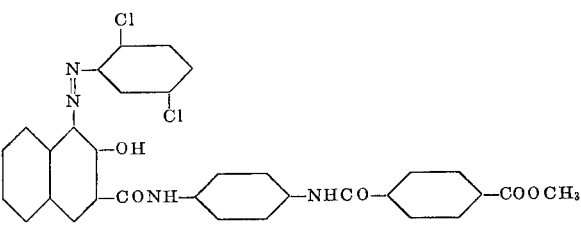

5. The pigment of the formula

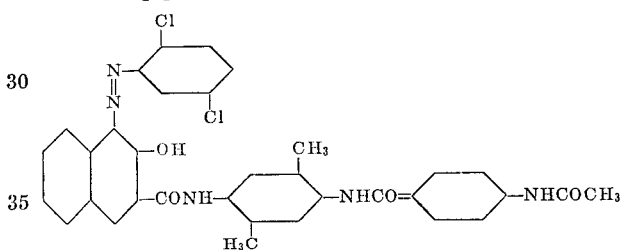

6. The pigment of the formula

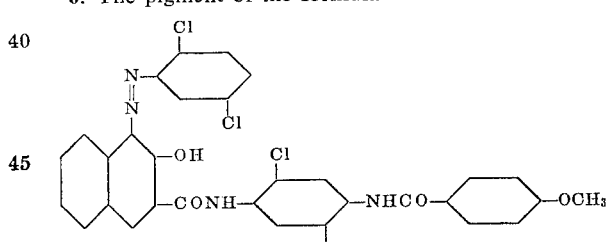

7. The pigment of the formula

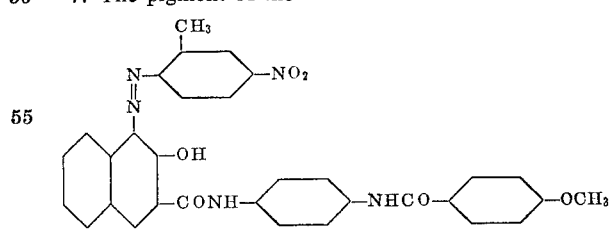

References Cited
UNITED STATES PATENTS 1,947,550   2/1934   Hitch _____ 260—240 X
2,088,726   8/1937   Sexton _____ 260—240 X FLOYD D. HIGEL, *Primary Examiner.*

UNITED STATES PATENT OFFICE
CERTIFICATE OF CORRECTION

Patent No. 3,394,124                            July 23, 1968

Karl Ronco et al.

It is certified that error appears in the above identified patent and that said Letters Patent are hereby corrected as shown below:

Column 8, lines 27 to 37, the right-hand portion of the formula should appear as shown below:

Signed and sealed this 20th day of January 1970.

(SEAL)
Attest:

Edward M. Fletcher, Jr.                      WILLIAM E. SCHUYLER, JR.
Attesting Officer                              Commissioner of Patents